(12) United States Patent
Matsuyama

(10) Patent No.: US 8,511,901 B2
(45) Date of Patent: Aug. 20, 2013

(54) IMAGE RECORDING APPARATUS AND METHOD

(75) Inventor: Ichiro Matsuyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1053 days.

(21) Appl. No.: 12/026,679

(22) Filed: Feb. 6, 2008

(65) Prior Publication Data

US 2008/0186392 A1 Aug. 7, 2008

(30) Foreign Application Priority Data

Feb. 6, 2007 (JP) ................................. 2007-027106
Nov. 27, 2007 (JP) ................................. 2007-306000

(51) Int. Cl.
*H04N 3/14* (2006.01)

(52) U.S. Cl.
USPC ........................................................ 384/294

(58) Field of Classification Search
USPC .......................................... 386/95; 348/294
See application file for complete search history.

(56) References Cited

U.S. PATENT DOCUMENTS

| 4,889,423 | A | * | 12/1989 | Trumbull | 352/46 |
|---|---|---|---|---|---|
| 5,659,382 | A | * | 8/1997 | Rybczynski | 352/46 |
| 5,796,439 | A | * | 8/1998 | Hewett et al. | 348/459 |
| 5,911,008 | A | * | 6/1999 | Niikura et al. | 382/236 |
| 7,400,359 | B1 | * | 7/2008 | Adams | 348/441 |
| 7,420,618 | B2 | * | 9/2008 | Swartz | 348/554 |
| 7,463,686 | B2 | * | 12/2008 | Seo | 375/240.16 |
| 2004/0136689 | A1 | | 7/2004 | Oka | |
| 2005/0265448 | A1 | * | 12/2005 | Nozawa | 375/240.12 |
| 2006/0198392 | A1 | * | 9/2006 | Park et al. | 370/468 |
| 2007/0013808 | A1 | * | 1/2007 | Tagawa | 348/362 |

FOREIGN PATENT DOCUMENTS

| JP | 2001-036848 A | 2/2001 |
|---|---|---|
| JP | 2004-242267 A | 8/2004 |
| JP | 2004242267 A | 8/2004 |
| WO | 2009013907 A1 | 1/2009 |

* cited by examiner

*Primary Examiner* — Michael S McNally
(74) *Attorney, Agent, or Firm* — Canon USA Inc IP Division

(57) ABSTRACT

An image recording apparatus converts a frame number of stream data of a moving image signal recorded at a high speed frame rate and generates stream data of a low speed frame rate. The image recording apparatus records in a recording medium, already recorded stream data of a low speed frame rate and the generated stream data of a low speed frame rate so that both stream data can be continuously reproduced.

11 Claims, 11 Drawing Sheets

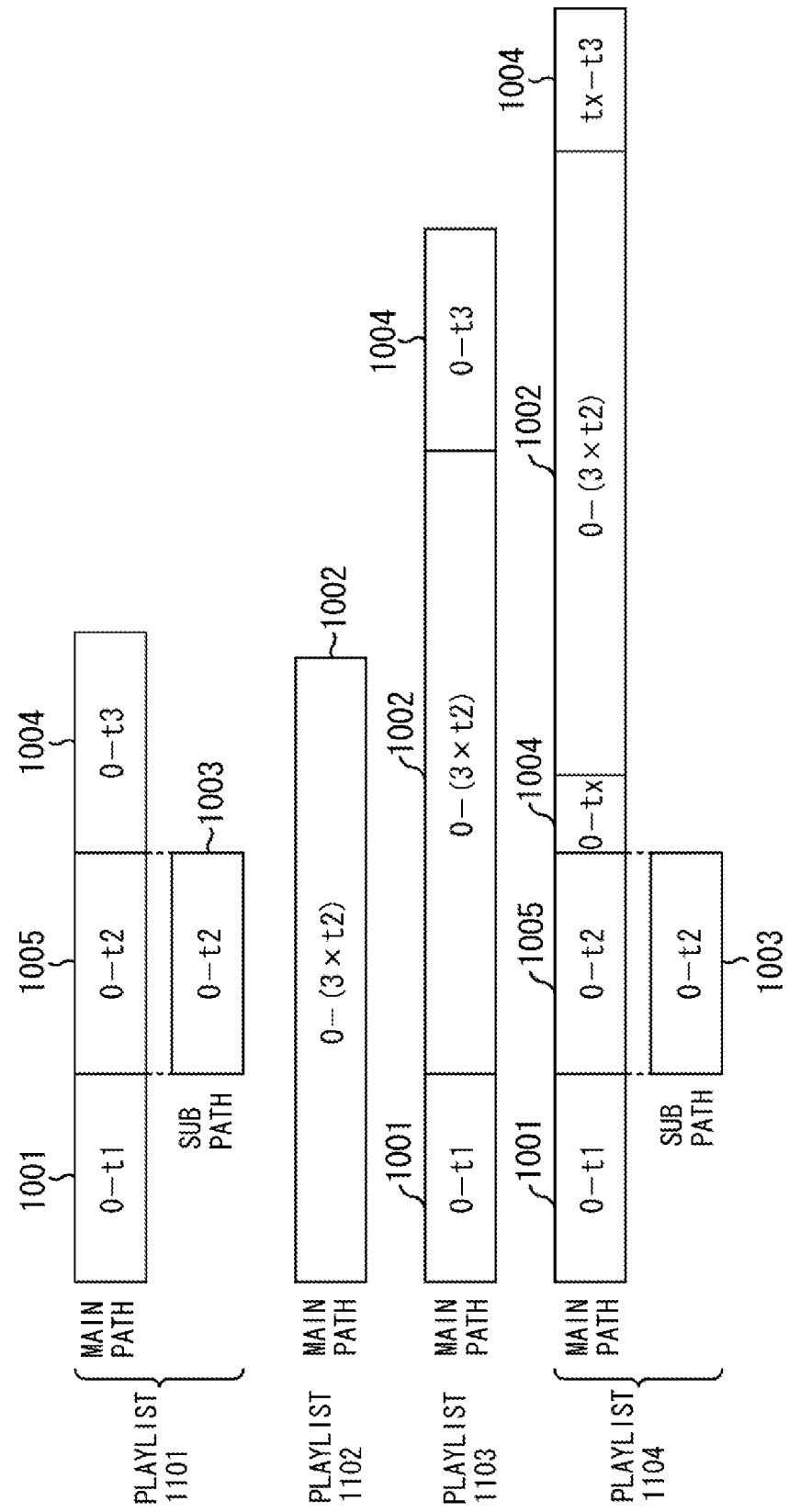

IMAGE RECORDING APPARATUS AND METHOD

CROSS-REFERENCE TO RELATED APPLICATIONS

This application claims priority from Japanese Patent Application Nos. 2007-027106 filed Feb. 6, 2007 and 2007-306000 filed Nov. 27, 2007, which are hereby incorporated by reference herein in their entirety.

BACKGROUND OF THE INVENTION

1. Field of the Invention

The present invention relates to an image recording apparatus and method, and in particular to a technique which can be employed to record a moving image signal of a high speed frame rate in response to an instruction for switching a frame rate while recording a moving image signal of a standard frame rate.

2. Description of the Related Art

In general, an image sensor is used for a video camera. For example, a charge-coupled device (CCD) sensor is used. Alternatively, a complementary metal-oxide semiconductor (CMOS) sensor is also used. Recently, it is possible to drive these image sensors at a high speed, so that a video image is read at a high speed frame rate in comparison with a standard rate and recorded in a recording medium so that a slow video image can be reproduced with a smooth motion.

In a moving image of a high speed frame rate, a data amount in a recording time increases in comparison with a standard rate, so that a recordable time relative to recording medium capacity is reduced. On the other hand, in the case of maintaining a length of the recording time, a data amount per frame is reduced, accordingly, the image quality of the recorded moving image is degraded. Therefore, when a moving image is captured, a user may want to record only a specific scene during the shooting at a high-speed frame rate.

Japanese Patent Application Laid-open No. 2004-242267 describes a technique of generating from input moving image data, a moving image for normal reproduction, and generating a moving image for slow reproduction only at a predetermined section of the moving image. In addition, Japanese Patent Application Laid-open No. 2001-036848 describes the following technique. A moving image for slow reproduction read out at a high-speed frame rate from an image sensor is recorded in a hard disk drive (HDD) at a high speed. At the same time, a moving image for normal reproduction as to the same scene is recorded in a digital video cassette (DVC). Then, a slow video image is obtained by sequentially reading the moving images at a normal speed which is recorded in the HDD at a high speed.

On the other hand, a digital versatile disc (DVD) has been increasingly used as a recording medium for recording a moving image and a voice captured by a video camera. Many of these video cameras encode the captured moving image and voice with codec of Moving Picture Experts Group (MPEG). Then, the video camera records the encoded data as video data corresponding to a "DVD-Video" (hereinafter, referred to as "VIDEO") format or a "DVD Video Recording" (hereinafter, referred to as "VR") format. In addition, recently, an HDD or a Blu-ray disc (BD) is employed as a recording medium other than the DVC or DVD in a video camera.

However, when a function of the high speed frame rate described above is performed using such a video camera, a moving image for normal reproduction and a moving image for slow reproduction are simultaneously generated according to the technique described in Japanese Patent Application Laid-open No. 2004-242267, thus imposing large load on an apparatus and incurring high cost.

In addition, according to the technique described in Japanese Patent Application Laid-open No. 2001-036848, two recording mediums are retained in order to record both of a moving image for normal reproduction and a moving image for slow reproduction, thus resulting in high cost.

Further, in the case of a video camera in which a DVD or the like is used as a recording medium, compatibility is important. For example, there is a possibility that a DVD in which encoded image data has been recorded by the video camera is set at other reproduction apparatus. In such a case, a video camera needs to carry out data recording in a mode considering compatibility so that another reproduction apparatus normally recognizes the inserted DVD and continuously reproduces image data based on a plurality of the recorded frame rates. However, the techniques of Japanese Patent Application Laid-open Nos. 2004-242267 and 2001-036848 do not consider the compatibility about a recording medium or recording data.

SUMMARY OF THE INVENTION

Exemplary embodiments of the present invention are directed to providing an apparatus capable of carrying out normal reproduction and smooth slow reproduction at a low cost.

Further, exemplary embodiments of the present invention are directed to recording a plurality of image data which enables continuous reproducing of moving images which are recorded in a recording medium based on a plurality of frame rates, wherein the compatibility about a recording medium or recording data is considered.

According to embodiments of the present invention, there is provided an image recording apparatus comprising a moving image generating unit configured to generate a moving image signal corresponding to a plurality of frame rates, an instruction unit configured to instruct a change of a frame rate of a moving image signal to be recorded in a recording medium, a recording unit configured to record a moving image signal by changing a first frame rate to a second frame rate that is faster than the first frame rate in response to an instruction from the instruction unit, when the moving image signal generated by the moving image generating unit is recorded at the first frame rate, a reproduction unit configured to identify stream data of the moving image signal recorded by changing the first frame rate to the second frame rate and to reproduce the identified stream data from the recording medium, and a frame rate converting unit configured to convert a frame number of the stream data reproduced by the reproduction unit and to generate stream data of the first frame rate from the reproduced stream data, wherein the recording unit records in a continuously reproducible state, stream data of the first frame rate based on the moving image signal generated by the moving image generating unit and stream data of the first stream rate generated by the frame rate converting unit in the recording medium such that both stream data can be continuously reproduced.

According to embodiments of the present invention, there is provided an image recording method comprising first recording wherein a moving image signal is recorded in a recording medium at a first frame rate; instructing to change a frame rate of a moving image signal to be recorded, second recording wherein a moving image signal is continuously recorded while the first frame rate is changed to a second frame rate that is faster than the first frame rate, in response to the instruction, reproducing data wherein steam data of a moving image recorded by changing the first frame rate to the second frame rate is identified and reproducing the identified stream data from the recording medium after terminating the second recording, frame rate converting wherein a frame number of stream data reproduced in the reproduction is converted and stream data of the first frame rate is generated from the reproduced stream data, third recording wherein stream data of the first frame rate generated in the frame rate converting is recorded in the recording medium, and fourth recording wherein in the recording medium, information for continuously reproducing stream data of the first frame rate based on the moving image recorded in the first recording and stream data generated in the frame rate converting, is recorded.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a view illustrating a recording example of a play list according to the second exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
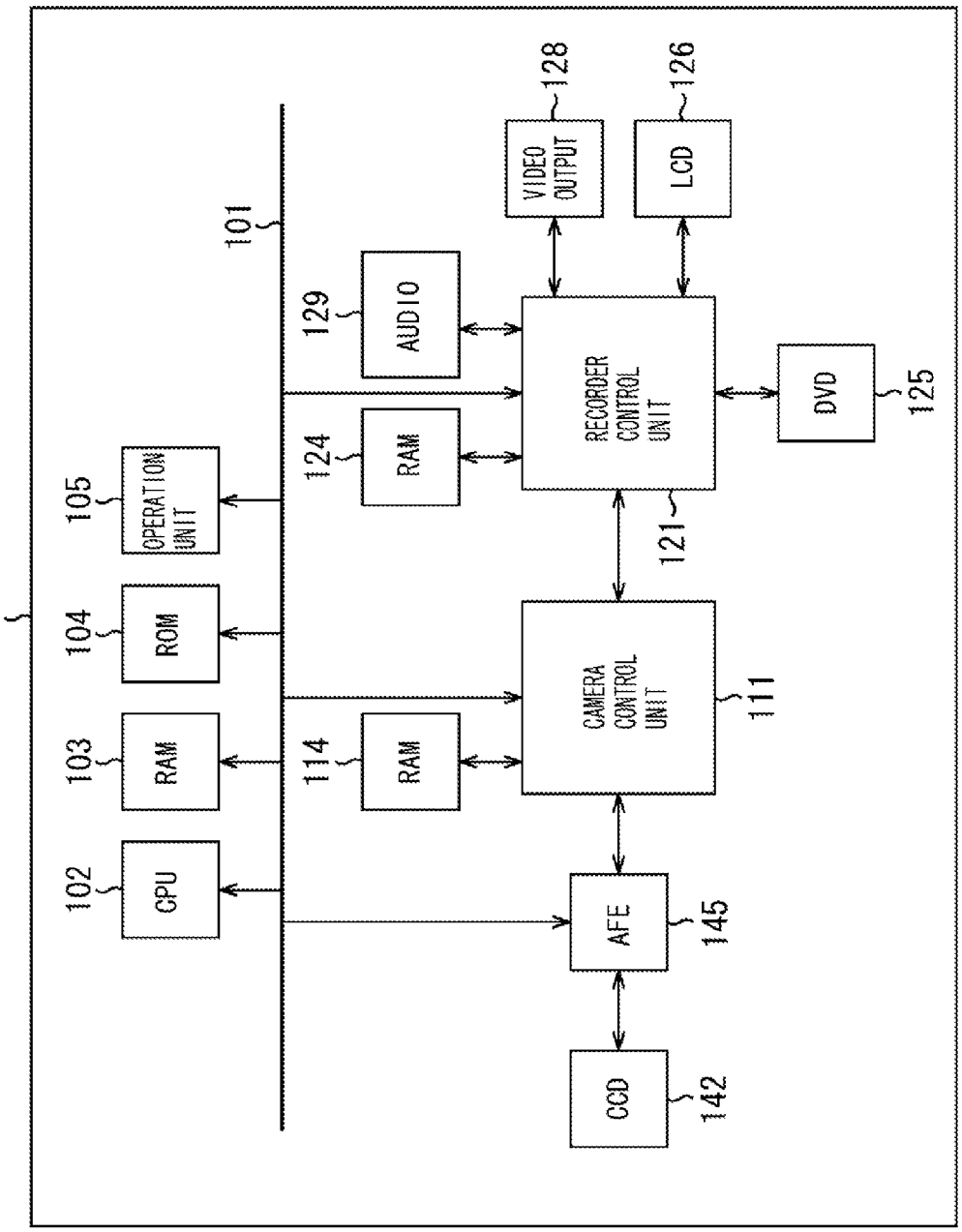
FIG. 1 is a block diagram illustrating an exemplary configuration of an image recording apparatus according to a first exemplary embodiment of the present invention.

A first embodiment will be described in an order below.
(1) Entire configuration
(2) Camera mode
(2-1) Operation of camera system device
(2-2) Operation of recording system device
(2-3) Example of DVD recording
(2-3-1) Stream recording
(2-3-2) Generating play list
(3) Reproduction mode
(3-1) Operation of recording system device
(3-2) Reproduction example of DVD
(1) Entire Configuration FIG. 1 is a block diagram illustrating an exemplary configuration of an image recording apparatus according to a first exemplary embodiment of the present invention. Hereinafter, as one example of the image recording apparatus, a video camera 100 will be described.

To a central processing unit (CPU) 102 of the video camera 100 of FIG. 1, a random access memory (RAM) 103, a read only memory (ROM) 104, an operation unit 105, a camera control unit 111, a recorder control unit 121, an analog front end (AFE) 145 are connected via a bus 101.

The CPU 102 operates according to a control program stored in the ROM 104, and the RAM 103 is employed as a temporary information storage at the time of operation. In addition, the CPU 102 receives asserting of a periodic interrupt signal issued from the camera control unit 111, so that the CPU 102 periodically carries out referencing to or setting of connected devices, and controls an entire operation of the video camera 100. Further, the CPU 102 acquires a user's operation state from the operation unit 105 and performs settings relative to the AFE 145, the camera control unit 111, and the recorder control unit 121 based on the acquired operation state. Thus, the CPU 102 carries out the entire control of the video camera 100.

Figure 2:
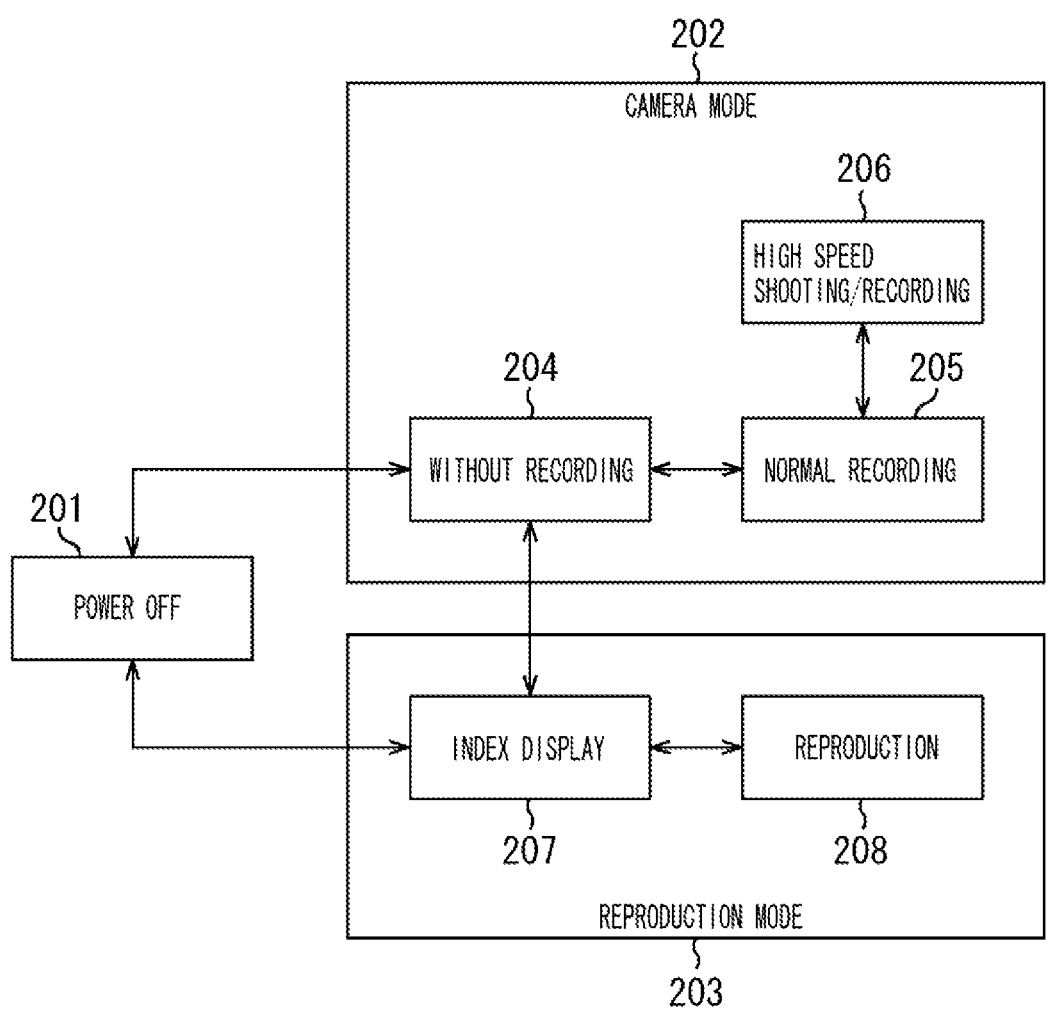
FIG. 2 is a view illustrating transition of a state in an image recording apparatus.

More specifically, the operation unit 105 includes: a mode dial; a shooting button; a high speed shooting button; a cross key; a reproduction button; a stop button; and a play list switch button (not illustrated), and the CPU 102 performs state transition illustrated in FIG. 2 in response to the instruction from these operation switches.

First, the mode dial is a dial switch that has three positions, and is switched between the states of [power OFF 201], [camera mode 202], and [reproduction mode 203] according to the setting position. The initial state of [camera mode 202] is a [without recording 204] state. When the shooting button is depressed, the current state moves to a [normal recording 205] state.

When the shooting button is depressed in the [normal recording 205] state, the current state reverts to [without recording 204]. In addition, when a high speed shooting button is pressed in the [normal recording 205] state, the current state moves to the [high speed shooting/recording 206] state. Further, when the high speed shooting button is depressed in the [high speed shooting/recording 206] state, the current state reverts to the [normal recording 205] state.

On the other hand, the initial state of [reproduction mode 203] is the [index display 207]. When the reproduction button is depressed, the current state moves to the [reproduction 208] state. When the stop button is depressed in the [reproduction 208] state, the current state moves to the [index display 207] state. An operation of the video camera 100 in these states will be described below.
(2) Camera Mode In [camera mode 202], an object is shot and a moving image signal is generated by a moving image generating unit.

The moving image generating unit includes a CCD image sensor 142, the AFE 145, and the camera control unit 111. Then, the moving image signal is output to a video output unit 128 and a liquid crystal display device (LCD) 126 via the recorder control unit 121. In addition, a voice signal generated by a microphone (not illustrated) is input from an audio input/output unit 129 that functions as a voice input unit.

Further, in the [normal recording 205] state and [high speed shooting/recording 206] state, the moving image signal and the voice signal processed in the recorder control unit 121 are recorded in a DVD 125. Thus, moving image recording and voice recording are carried out.

(2-1) Operation of Camera System Device

The CCD image sensor 142 includes, on a photoreceptor surface (not shown), a photodiode, a vertical transfer circuit including a CCD, and a horizontal transfer circuit including a CCD. Further, the CCD image sensor 142 includes an electric charge detector (FD) circuit at an output unit. The photodiodes are disposed as pixels in a matrix shape and accumulate an electric charge responsive to an exposure time. While the CCD is employed in this exemplary configuration, a CMOS may also be employed as an image sensor.

The horizontal transfer circuit and vertical transfer circuit are driven in response to a timing signal from the AFE 145, and serially transfer to the output unit the electric charge accumulated in the photodiode. The FD circuit outputs a potential difference proportional to the transferred electric charge volume as an image signal.

The AFE 145 includes: a timing generator (TG) circuit; a correlated double sampling (CDS) circuit; an automatic gain control (AGC) circuit; and an analog/digital (A/D) converting circuit (not shown).

The TG circuit outputs a variety of timing signals based on settings made by the CPU 102 while a sync signal output from a sync signal generating circuit of the camera control unit 111 serves as a reference. The CDS circuit samples an image signal output from the CCD image sensor 142 while eliminating the noise generated between pixels at the time of image signal readout. The AGC circuit amplifies an image signal output from the CDS circuit according to gain setting made by the CPU 102 in the case where an output voltage is small because of shortage of exposure time. The AGC circuit outputs the amplified signal to the A/D converting circuit. The A/D converting circuit converts an image signal from an analog signal to a digital signal, and outputs the converted signal to the camera control unit 111.

The camera control unit 111 is an application specific IC (ASIC) that includes: a sync signal generating circuit; an interrupt generating circuit; an image signal input circuit; an image signal processing circuit; an image signal output circuit; and a memory control circuit (not illustrated).

The sync signal generating circuit generates a vertical sync (VD) signal and a horizontal sync (HD) signal, which are asserted at an interval according to a frame rate of shooting. The interrupt generating circuit asserts an interrupt signal relative to the CPU 102 at the time of asserting the VD signal. The image signal input circuit acquires an image signal that is output from the A/D converting circuit of the AFE 145, in synchronization with a timing signal output from the TG circuit of the AFE 145.

The image signal processing circuit performs a variety of image signal processing operations such as color conversion or resolution conversion on an image signal input from the image signal input circuit according to the setting made by the CPU 102. In addition, the image signal output circuit outputs to the recorder control unit 121 an image signal obtained as a result of the signal processing. The memory control circuit controls reading/writing of data from and to a RAM 114 as a temporary image signal storage for the image signal input circuit, the image processing circuit and the image signal output circuit.

Now, an operation is described with respect to the CCD image sensor 142, the AFE 145, and the camera control unit 111 in the [high speed shooting/recording 206] state.

In the [high speed shooting/recording 206] state, the CPU 102 sets frequencies of a VD signal and a HD signal output from the sync signal generating circuit to three times the [without recording 204] state and [normal recording 205] state, to the camera control unit 111.

At the same time, the CPU 102 sets three times frequencies of a variety of timing signals output from the timing signal generating circuit to the AFE 145. In this manner, the electric charge accumulated in a photodiode of a CCD image sensor 142 is vertically and horizontally transferred at a 3× speed, and an image signal can be read out at a 3× speed in comparison with a normal speed from the FD circuit.

The AFE 145 and the camera control unit 111 process the image signal read out from the CCD image sensor 142 at a 3× speed in comparison with a normal speed, so that a moving image is captured at a high speed frame rate. Thus, in the case where a video system is NTSC, in the [without recording 204] state and [normal recording 205] state, shooting is performed at 30 frames per second as a standard rate and at 90 frames per second (i.e., a 3× speed) in the [high speed shooting/recording 206] state. Hereinafter, a description will be given assuming that the video system is NTSC and a frame rate of normal recording is 30 frames per second.

(2-2) Operation of Recorder System Device

A recorder control unit 121 includes: an image signal input circuit; an image encoding circuit; an image decoding circuit; a voice signal input circuit; a voice signal input circuit; a voice signal processing circuit; a voice signal output circuit; a voice encoding circuit; and a voice decoding circuit (not illustrated). The recorder control unit 121 serving as an ASIC, further includes: a DVD control circuit; an index generating circuit; an image signal output circuit; an LCD control circuit; and a memory control circuit.

The image signal input circuit acquires an image signal output from the image signal output circuit of the camera control unit 111. In addition, the voice signal input circuit acquires a voice signal output from an audio input/output unit 129. The voice signal processing circuit carries out a variety of voice signal processing operations such as noise elimination or level adjustment with respect to a voice signal input from the voice signal input circuit.

The image signal output circuit outputs an image signal input from the image signal input circuit to the video output unit 128. The LCD control circuit outputs the image signal output by the image signal output circuit to the LCD 126. The voice signal output circuit outputs to the audio input/output unit 129 a voice signal obtained as a result of the signal processing. The memory control circuit controls reading/writing of data from and to a RAM 124 as a temporary image signal storage for the image signal input circuit, the voice signal input circuit, and the voice signal processing circuit.

In the [normal recording 205] state, the recorder control unit 121 further operates as follows.

The image encoding circuit carries out an encoding process in an MPEG format with respect to the image signal input from the image input circuit. The voice signal encoding circuit carries out an encoding process in the MPEG format with respect to the voice signal obtained as a result of the signal processing. The memory control circuit controls reading/writing of data from and to the RAM 124 as a temporary image signal storage for the image encoding circuit, the voice encoding circuit, and the DVD control circuit.

Under control of a CPU 102, encoded data of the image signal and encoded data of the voice signal are written into the RAM 124 as a stream that is multiplexed to synchronously reproduce a moving image and a voice. A DVD control circuit records the stream in a DVD 125 serving as a recording medium in a logical format of DVD. In the present embodiment, a moving image is recorded in the DVD 125 by the recorder control unit 121 that functions as a moving image recording unit.

In the [high speed shooting/recording 206] state, the recorder control unit 121 carries out a process for acquiring and encoding an image signal at a 3× speed in comparison with a process in the [normal recording 205] state. In this case, the image encoding circuit carries out an encoding process at a frame rate of 30 frames per second at the time of reproduction regardless of a frame rate of an input image signal.

When the thus recorded stream data is reproduced, the moving image shot at 90 frames per second becomes the moving image that is reproduced at 30 frames per second, that is, at a speed of ⅓, and a smooth slow video image can be obtained. On the other hand, unlike the [normal recording 205] state, encoded data of a voice signal is stream-multiplexed in a format that does not influence reproduction, for example, a private stream, and the multiplexed stream is recorded in the DVD 125.

In the case where the encoding process is carried out according to an encoding system that is the same as the process in the [normal recording 205] state (e.g., inter-frame reference system or intra-frame reference system), and according to encoding parameters, a data rate of encoded data is about 3 times in comparison with that in the [normal recording 205] state. Thus, it becomes necessary for the DVD control circuit to record the data into the DVD 125 at a high speed. Therefore, at least a 4× speed writing defined in the DVD Standard is necessary, or it is desirable that recording is performed at 8× or 12× speed if possible. In other words, at the time of encoding at a high-speed frame rate, it is desirable to carry out encoding of a moving image of a normal frame rate using different encoding systems or different encoding parameters.

Alternatively, the encoding process can be carried out using an encoding method or encoding parameters whose compression rate is high in comparison with that in the [normal recording 205] state, thereby writing into the DVD 125 can be performed without significantly increasing a data rate. To change the encoding method, for example, a picture configuration of MPEG may be changed as described later. Writing into the DVD 125 may be performed by way of dynamically changing the encoding method or encoding parameters depending on a use situation of a buffer memory storing intermediate data for an encoding process and a buffer memory storing data to be recorded in the DVD 125.

When the [normal recording 205] state moves to the [without recording 204] state, management information such as a play list relative to the stream so far recorded in the DVD 125 is generated by the CPU 102, and is written into the RAM 124. The DVD control circuit of the recorder control unit 121 records the management information in the DVD 125.

(2-3) Example of DVD Recording

Next, an example of recording into DVD 125 will be described in the case where a moving image of a high speed frame rate is to be shot while a moving image of a normal frame rate is being shot using the video camera 100 of the present embodiment. For example, in the case where the logical format of DVD is "VR" in the DVD Standard, stream data serving as real data of a moving image and a voice, and a play list specifying a reproduction sequence are recorded as follows.

(2-3-1) Stream Recording

First, with reference to FIG. 3A to FIG. 3D, an example of recording the stream data in the DVD 125 is described.

Figure 3A:
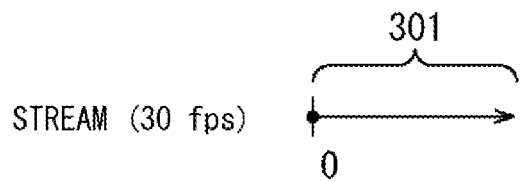
FIG. 3A, FIG. 3B, FIG. 3C, and FIG. 3D are views each illustrating a recording example of a stream according to the first exemplary embodiment of the present invention.

When a user depresses an shooting button, and the [without recording 204] state moves to the [normal recording 205] state, a moving image and a voice shot at 30 frames per second are recorded as a stream 301, as illustrated in FIG. 3A.

Figure 3B:
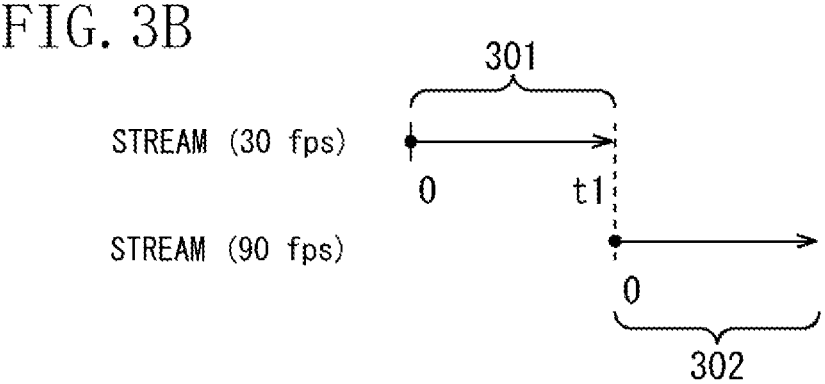

Next, after recording of the stream 301 is started, a high speed shooting button is depressed at a time t1, and the current state moves to the [high speed shooting/recording 206]. Then, recording of the stream 301 is terminated as illustrated in FIG. 3B. Subsequently, a moving image shot at 90 frames per second is newly recorded as a stream 302. At the same time, a voice is multiplexed as a private stream in the stream 302 and is recorded.

Figure 3C:
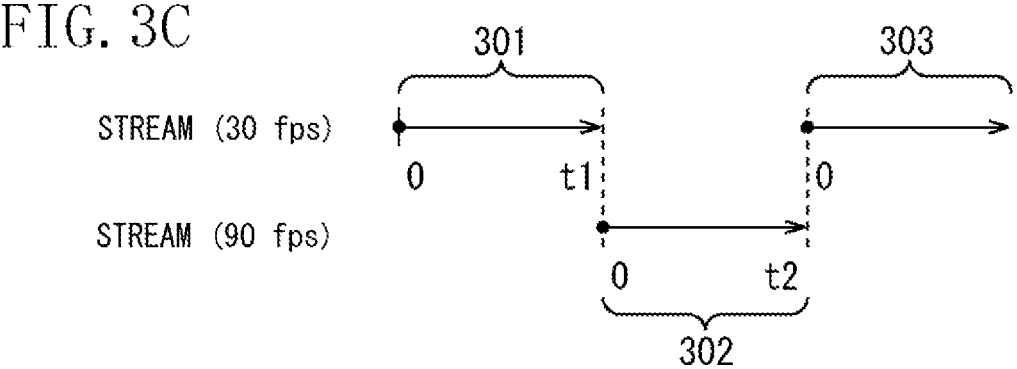

Next, after recording of the stream 302 is started, the high speed shooting button is depressed at a time t2, and the current state moves to the [normal recording 205] state. Then, recording of the stream 302 is terminated as illustrated in FIG. 3C. Subsequently, a moving image and a voice shot at 30 frames per second are newly recorded as stream 303. At a period from t1 to t2, information that the stream 302 has been recorded at a high-speed frame rate, and identification information identifying a recording area, are recorded in a management information area of the DVD 125.

Figure 3D:
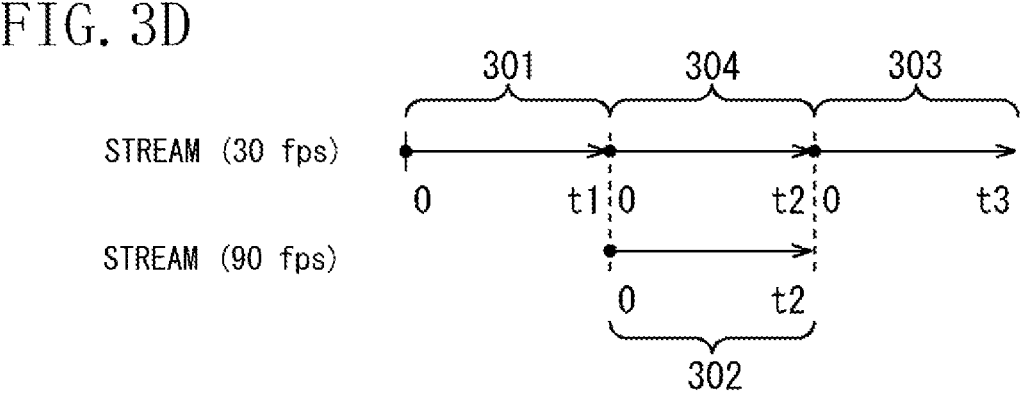

Lastly, after recording of the stream 303 is started, an shooting button is depressed at a time t3, and the current state moves to the [without recording 204] state. Then, recording of the stream 303 is terminated as shown in FIG. 3D. At this time, the CPU 102 controls the recorder control unit 121, carries out a frame number converting process described later, and generates a stream 304 from the stream 302.

The frame number converting process will be described below.

In the [without recording 204] state, if the frame number converting process has not yet been carried out with respect to the stream 302 of a moving image shot at a high speed frame rate, the recorder control unit operates and carries out the frame number converting process under control of a CPU 102 as follows. A DVD control circuit reads out encoded data of the stream 302 that is encoded at a high-speed frame rate, from the DVD 125 according to identification information recorded in the DVD 125.

Figure 4:
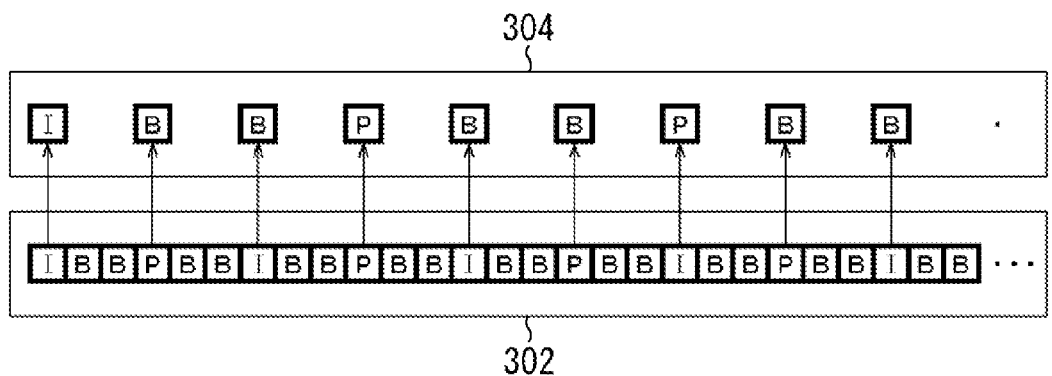
FIG. 4 is a view illustrating a picture configuration of MPEG.

An image decoding circuit divides a moving image of the read out stream in units of MPEG pictures. As illustrated in FIG. 4, the moving image of the stream 302 is encoded as MPEG data including "I B B P B B", that is, one reference (I and P) picture in three pictures. The reference picture denotes a picture that is referred to from other pictures at the time of decoding. For example, while B-picture references I-picture or P-picture disposed before and after the B-picture, P-picture references only I-picture or P-picture disposed before the P-picture, and I-picture does not reference other pictures.

In comparison with the case of decoding all pictures, in the case of decoding only a reference picture, a reference relationship between the pictures is simplified, accordingly, a load of decoding is reduced. An image decoding circuit decodes only these reference pictures. Further, an image encoding circuit generates a stream 304 of a new moving image which has ⅓ frame number. This encoding and decoding process is referred to as down sampling. In addition, the voice multiplexed as a private stream in the stream 302 is multiplexed in the stream 304 as a voice that can be reproduced in synchronization with the moving image. A generated stream 304 is recorded in DVD 125. In this manner, the stream 304 can be reproduced as a moving image with voice, similar to the streams 301 and 303 recorded in the [normal recording 205] state. In addition, by what a play list is generated by a following method, and is recorded in DVD 125, the stream 304 and other streams become in recording condition to be able to reproduce consecutively.

Thus, when a frame number converting process (down sampling) of the stream 302 is performed, a frame rate of a stream recorded immediately before or immediately after is determined, so that a frame rate of the stream 302 is converted according to the determined frame rate. In the present embodiment, frame rates of the immediately preceding stream 301 and the immediately succeeding stream 303 serve as a standard rate (30 fps), and a frame rate of the stream 302 to be down sampled is 90 fps, so that the number of frames is set to ⅓ at the conversion. Further, the stream 302 has reference pictures at an interval of one in three pictures, so that the stream 304 is generated from the reference pictures.

The thus generated stream 304 that is recorded in the DVD 125 serves as a stream that can be reproduced by other reproduction apparatuses. Further, the stream 304 can be continuously reproduced, using a play list, together with the stream 301 and the stream 303 that are temporally positioned before and after. In other words, by recording the stream 304, the compatibility relative to other reproduction apparatuses or other reproduction applications can be obtained with respect to a recording medium and recorded data.

Figure 5:
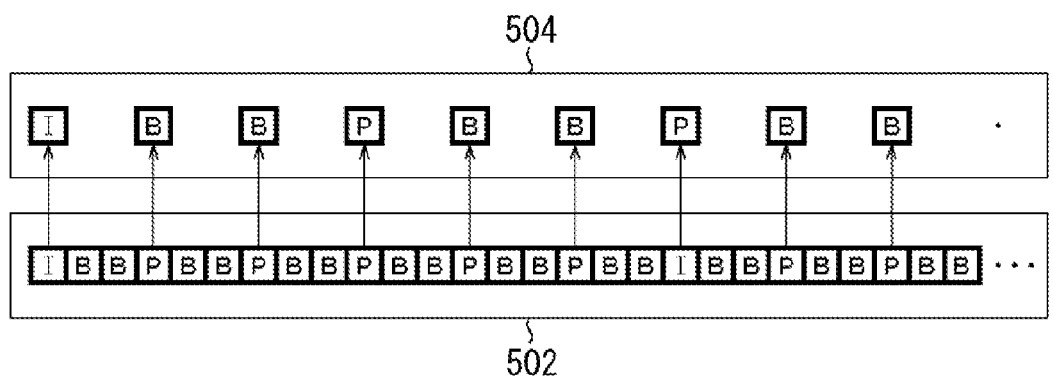
FIG. 5 is a view illustrating a picture configuration of MPEG in which a part of I-picture has been replaced with a P-picture.

The present embodiment describes an example of a picture configuration of "I B B P B B" that are most generally employed. However, in order to reduce a data rate of a stream 302 of a moving image shot at a high speed frame rate, a method of encoding the stream 302 may be different from the stream 301 and the stream 303. As an example of changing the method of encoding the stream 302, a stream 502 illustrated in FIG. 5 that is obtained by replacing partial I-picture with P-picture, may be employed. In this case, a stream 504 is generated by a frame number converting process.

Figure 6:
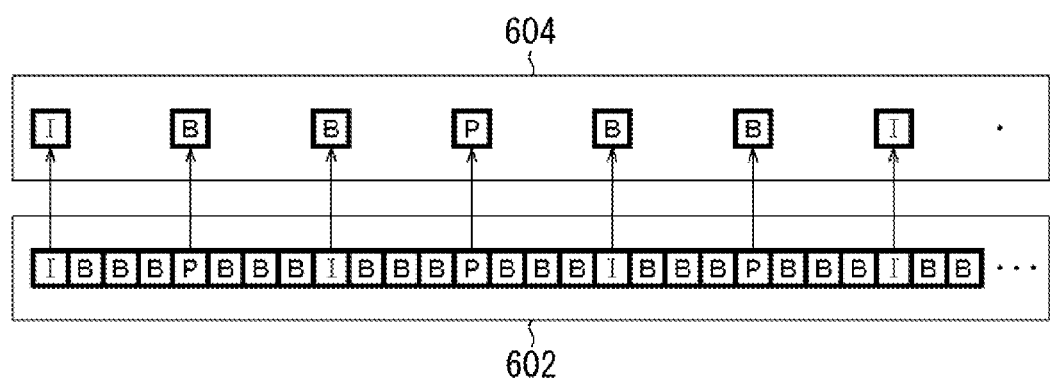
FIG. 6 is a view illustrating a picture configuration of MPEG of a stream shot at a 4× speed.

In addition, in the present embodiment, shooting at a high speed frame rate is carried out at a 3× speed as usual, so that it is suitable to carry out encoding one reference picture in three pictures. However, a high-speed frame rate can be arbitrarily changed to enable shooting at a 4× speed. In the case where the current speed is changed to a 4× speed, the stream 302 may be changed to a stream 602 illustrated in FIG. 6, that includes one reference picture in four pictures. In this case, a stream 604 is generated by a frame number converting process. Since a shooting speed (n× speed) and an appearance frequency of a reference picture (1/n) are adjusted, the frame number converting process can be realized only by decoding of a reference picture.

(2-3-2) Generating Play List

Figure 7:
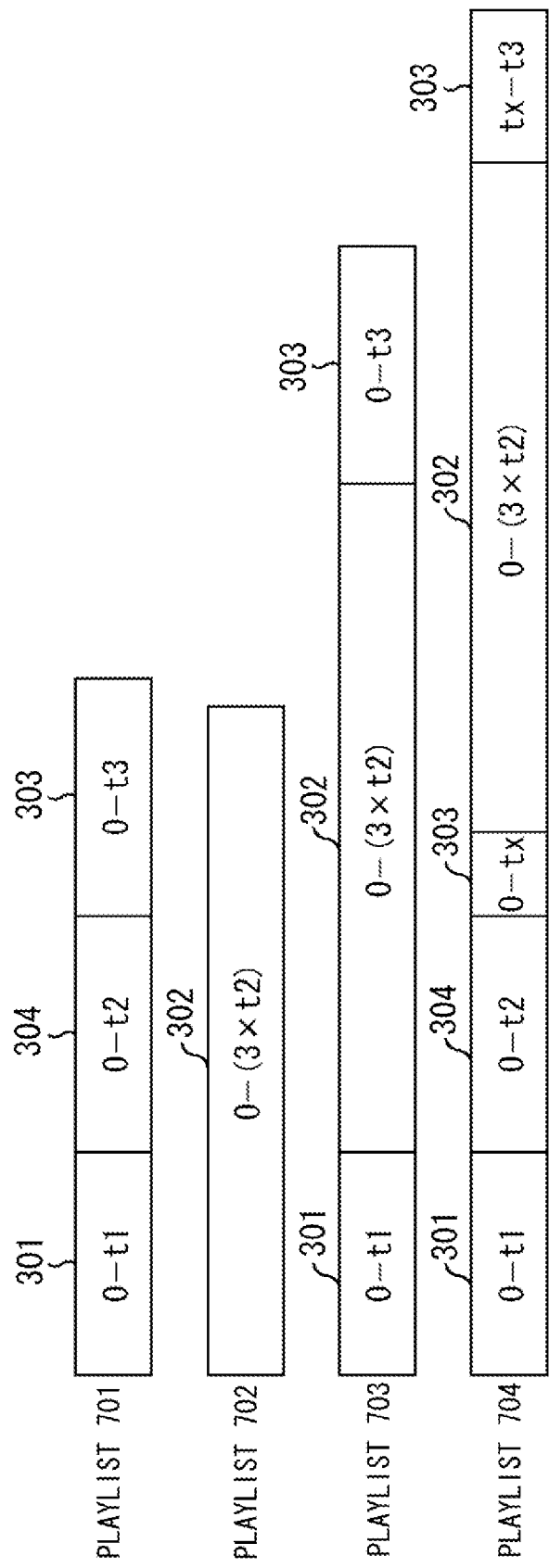
FIG. 7 is a view illustrating a recording example of a play list according to the first exemplary embodiment of the present invention.

Next, with reference to FIG. 7, an example will be described in which a play list indicating a reproduction sequence of a moving image recorded in the DVD 125 is recorded by the recorder control unit 121. The recorder control unit 121 functions as a reproduction sequential order recording unit.

With respect to the streams 301 to 304 recorded as described previously, a play list 701 is recorded as a standard play list (original PGC). In addition, any one or all of play lists 702 to 704 are recorded in the DVD 125 according to a user selection.

The play list 701 serves as a play list for continuously reproducing streams 301, 304, and 303. According to this play list, even if a moving image for slow reproduction is shot at a high speed frame rate with respect to only a specific scene, a continuous normal moving image from the start of shooting to the end of shooting (t1+t2+t3) can be reproduced.

A play list 702 serves as a play list for reproducing only the stream 302. Only a moving image of a specific scene shot at a high-speed frame rate can be slowly and smoothly reproduced. A reproduction time of this play list 702 is 3×t2.

A play list 703 serves as a play list for continuously reproducing streams 301, 302, and 303. Only a moving image of a specific scene can be smoothly and slowly reproduced, continuously shifting from and to normal reproduction of moving images in the preceding and succeeding scenes.

A play list 704 serves as a play list in which streams 301, 304, and 303 are continuously reproduced, and the stream 302 is inserted into "a time tx" after reproduction of the stream 303 is started. As can be seen in a broadcasting program of sports or the like, a normal moving image of a specific scene is reproduced, and after a short time has elapsed, advantageous effect can be easily attained such that a moving image of the specific scene is slowly and smoothly reproduced.

(3) Reproduction Mode

Next, an operation in [reproduction mode 203] will be described. In the [reproduction mode 203], the CCD image sensor 142, the AFE 145, and the camera control unit 111 do not operate. In a recorder control unit 121, a moving image and a voice recorded in the DVD 125 are reproduced, and the moving image is output to the video output unit 128 and the LCD 126 and the voice is output to the input/output unit 129.

(3-1) Operation of Recorder System Device

In an [index display 207] state, the recorder control unit 121 operates as follows. First, a memory control circuit controls reading/writing of data from and to the RAM 124 as a temporary image signal storage between a DVD control circuit and an image encoding circuit.

The DVD control circuit reads out a play list recorded in the DVD 125 according to a logical format of DVD, and stores the readout in the RAM 124. A stream including an image to be displayed as an index and a position of the image are determined from the play list by the CPU 102, and the DVD control circuit reads out from the DVD 125 a portion including the image of the stream and stores the readout data in the RAM 124. An image decoding circuit carries out a decoding process in an MPEG format with respect to the stream stored in the RAM 124. An index generating circuit generates an index image from the decoded image that is to be displayed as an index. An image signal output circuit outputs the index image to the video output unit 128. An LCD control circuit outputs the index image to the LCD 126.

In a [reproduction 208] state, the recorder control unit 121 operates as follows. First, a memory control circuit controls reading/writing of data from and to the RAM 124 as a temporary image signal storage for the DVD control circuit, the image decoding circuit, and the voice decoding circuit. The DVD control circuit of the recorder control unit 121 reads out a stream from the DVD 125 and stores the readout data in the RAM 124 according to a logical format of DVD.

The image decoding circuit carries out a decoding process in an MPEG format with respect to encoded data of an image signal included in the stream stored in the RAM 124. In addition, the voice decoding circuit carries out a decoding process in the MPEG format with respect to encoded data of a voice signal included in the stream that is stored in the RAM 124.

An image signal output circuit outputs to the video output unit 128 an image signal decoded by the image decoding circuit. An LCD control circuit outputs to the LCD 126 an image signal decoded by the image decoding circuit. A voice signal output circuit outputs a voice signal decoded by the voice decoding circuit to the audio input/output unit 129 in synchronization with an output of the image signal.

(3-2) Example of DVD Reproduction

Next, a reproduction example of the DVD 125 recorded in the recording example using the video camera 100 of the present embodiment will be described.

The logical format of the DVD is a DVD-VDR format, and the DVD 125 is reproduced as follows according to a recorded play list.

Figure 8:
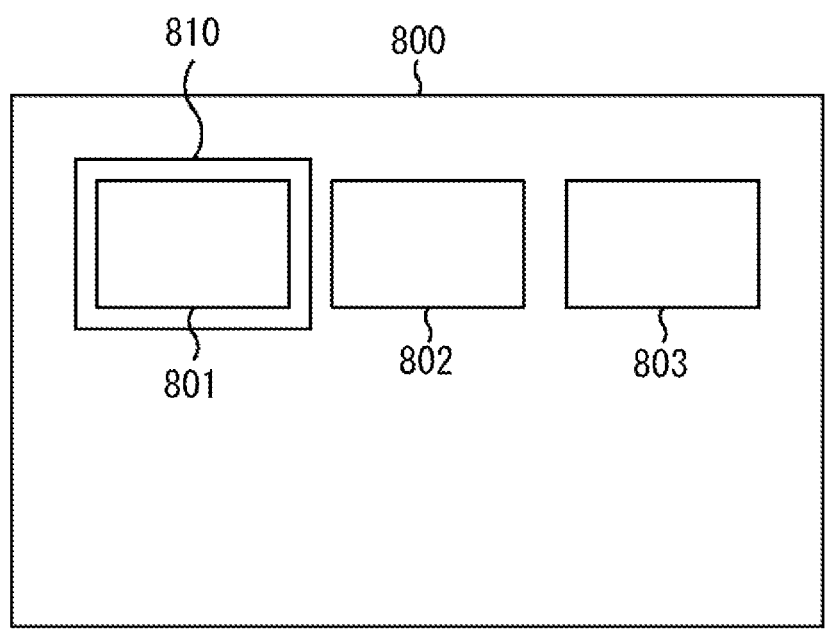
FIG. 8 is a view illustrating a display example of an index image.

In an [index display 207] state, a play list 701 serving as an original PGC is used for index display in an initial state. In other words, as a cut line of a stream to be reproduced in a play list 701, a head image 801 of the stream 301, a head image 802 of the stream 304, and a head image 803 of the stream 303 are arranged side by side, and an index image 800 is displayed as illustrated in FIG. 8.

When a user moves selection frame 810 for selecting an image displayed side by side with a cross key and depresses a reproduction button, the current state moves to the [reproduction 208] state, and a play list targeted for index display is reproduced from a cut line corresponding to a selected image. In this case, when the user presses a play list switch button of the operation unit 105, a play list serving as a target of index display is switched.

In the case where a play list 702 is targeted for index display, the head image of the stream 302 is index-displayed as a cut line of a stream to be reproduced. Similarly, in the case where the play list 703 is targeted for a process, the head image of the stream 301, the head image of the stream 302, and the head image of the stream 303 are arranged side by side, and the arranged images are displayed as an index. In addition, in the case where the play list 704 is targeted, the head image of the stream 301, the head image of the stream 303, the head image of the stream 302, and an image at a time of tx from the start of the stream 303 are arranged side by side, and the arranged images are displayed as an index.

Second Exemplary Embodiment

A second embodiment will be described in an order below.
(1) Entire configuration
(2) Camera mode
(2-1) Operation of camera system device
(2-2) Operation of recorder system device
(2-3) Example of BD recording
(2-3-1) Stream recording
(2-3-2) Generating of a play list
(3) Reproduction mode
(3-1) Operation of recorder system device
(3-2) Example of BD reproduction In comparison with the first embodiment, a configuration of a recorder control unit is different in the second embodiment. Further, the second embodiment is different in that BD is used as a recording medium. In addition, with respect to a scene shot at a high speed frame rate, a moving image and a voice are recorded as different streams.

(1) Entire Configuration

Figure 9:
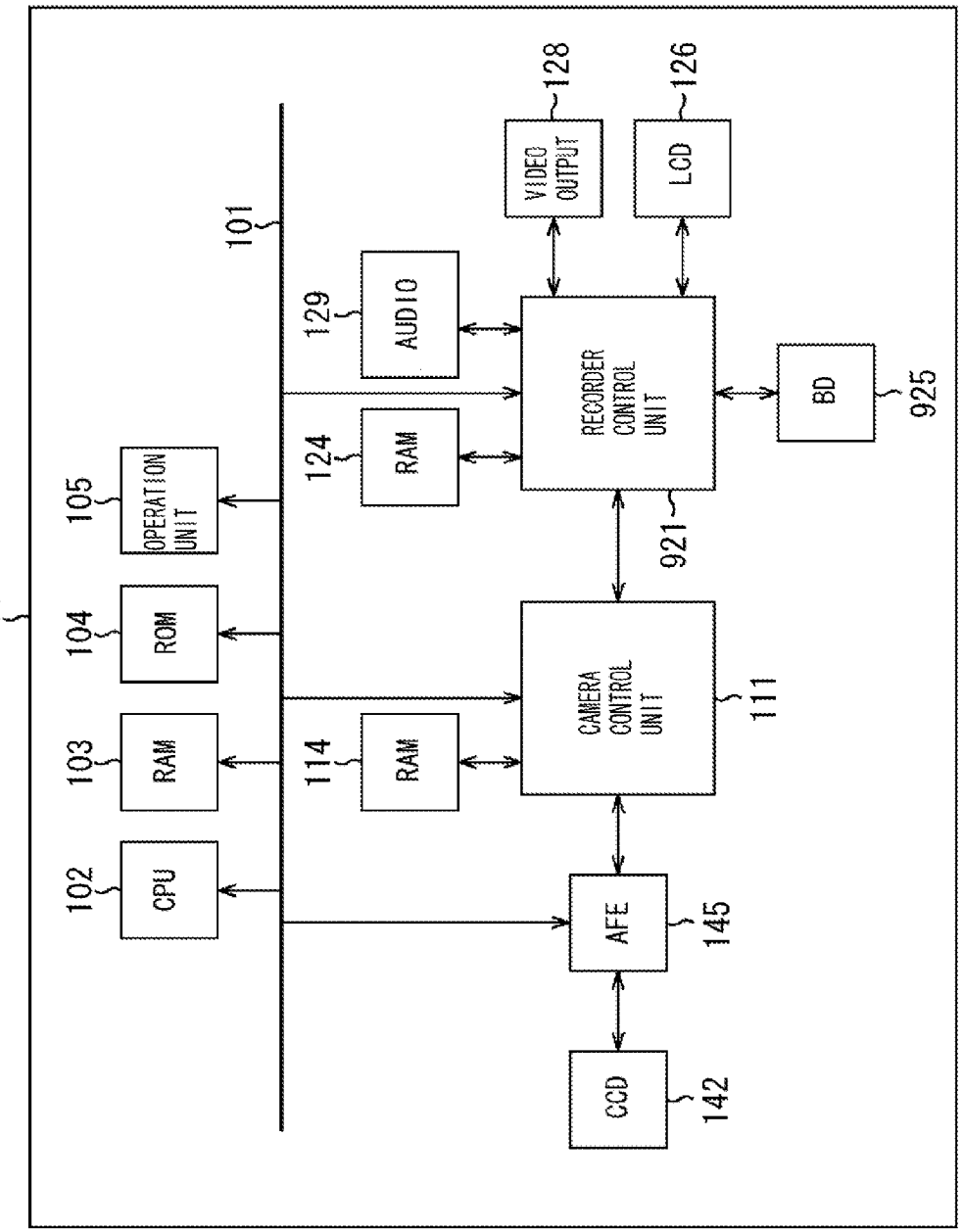
FIG. 9 is a block diagram illustrating an exemplary configuration of an image recording apparatus according to a second exemplary embodiment of the present invention.

FIG. 9 is a block diagram illustrating an exemplary configuration of an image recording apparatus according to a second embodiment. Hereinafter, as one example of the image recording apparatus, a description will be given by way of example of a video camera 900.

In the video camera 900, compared to the video camera 100 in the first embodiment, the recorder control unit 121 is replaced with a recorder control unit 921 with a different internal configuration, and the DVD 125 is replaced with a BD 925.

(2) Camera Mode

In the [normal recording 205] state and the [high speed shooting/recording 206] state, a moving image signal and a voice signal processed in the recorder control unit 921 are recorded into the BD 925.

(2-1) Operation of Camera System Device

An operation of the CCD image sensor 142, the AFE 145, and the camera control unit 111 is not described because it is identical to that of the first embodiment.

(2-2) Operation of Recorder System Device

A recorder control unit 921 serves as an ASIC with a configuration in which the DVD control circuit of the recorder control unit 121 in the first embodiment is replaced with a BD control circuit.

In the [normal recording 205] state, a memory control circuit controls reading/writing of data from and to a RAM 124 as a temporary image signal storage of the BD control circuit. The BD control circuit records a stream of a multiplexed moving image and a voice in a BD 925 serving as a recording medium according to a BD logical format.

In the [high speed shooting/recording 206] state, the recorder control unit 921 carries out a process for acquiring and encoding an image signal at a 3× speed in comparison with the [normal recording 205] state. In this case, the image encoding circuit carries out an encoding process while a frame rate at the reproduction time is defined as 30 frames per second regardless of a frame rate of an input image signal. On the other hand, encoded data of a voice signal is recorded in the BD 925 as a separate stream from a moving image unlike the [normal recording 205] state.

When the [normal recording 205] state moves to the [without recording 204] state, management information such as a play list relative to a stream recorded so far in the BD 925 is generated by the CPU 102, and the created information is written into the RAM 124. The BD control circuit of the recorder control unit 921 records the management information in the BD 925.

(2-3) Example of BD Recording

Next, an example of recording into the BD 925 will be described in which a moving image of a high speed frame rate is to be shot while a moving image at a normal frame rate is being shot using the video camera 900 of the present embodiment. In the case where a recording medium is a BD, a stream of real data of a moving image and a voice, and a play list specifying a reproduction sequence of the stream are recorded as follows in a logical format of BD.

(2-3-1) Stream Recording

First, an example of recording stream data in the BD 925 will be described with reference to FIG. 10A to FIG. 10D.

Figure 10A:
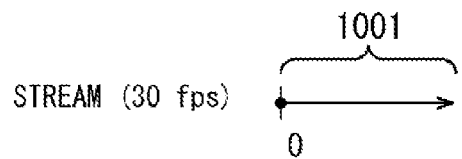
FIG. 10A, FIG. 10B, FIG. 10C, and FIG. 10D are views each illustrating a recording example of a stream according to the second exemplary embodiment of the present invention.

When a user depresses an shooting button, and the [without recording 204] state moves to the [normal recording 205] state, the moving image and the voice shot at 30 frames per second are recorded as a stream 1001, as illustrated in FIG. 10A.

Figure 10B:
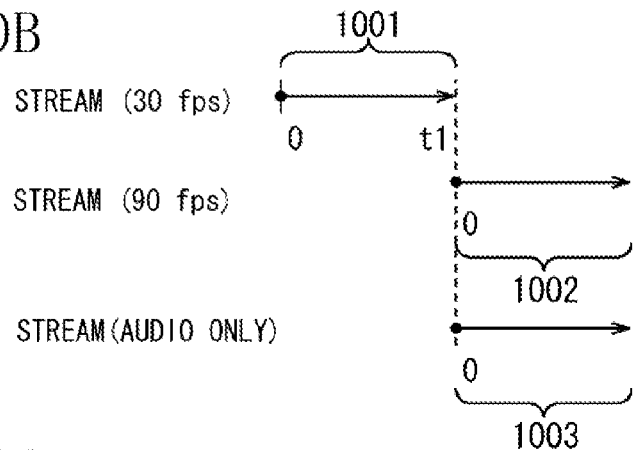

Next, after recording of the stream 1001 is started, a high speed shooting button is depressed at a time t1, and the current state moves to the [high speed shooting/recording 206] state. Then, recording of the stream 1001 terminates as illustrated in FIG. 10B. Subsequently, a stream 1002 including only a moving image shot at 90 frames per second and a stream 1003 including only a voice are newly recorded.

Figure 10C:
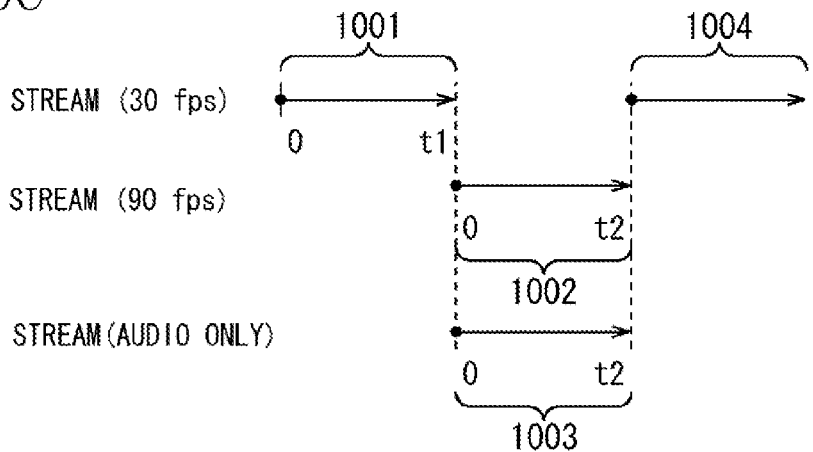

Next, after the recording of the streams 1002 and 1003 is started, a high speed shooting button is depressed at a time t2, and the current state moves to the [normal recording 205] state. Then, the recording of the streams 1002 and 1003 terminates as illustrated in FIG. 10C. Subsequently, the moving image and the voice shot at 30 frames per second are newly recorded as a stream 1004. The information that the stream 1002 at a high-speed frame rate and the voice stream 1003 have been recorded for a period from t1 to t2, and identification information for identifying a recording area, are recorded in a management information area of the BD 925.

Figure 10D:
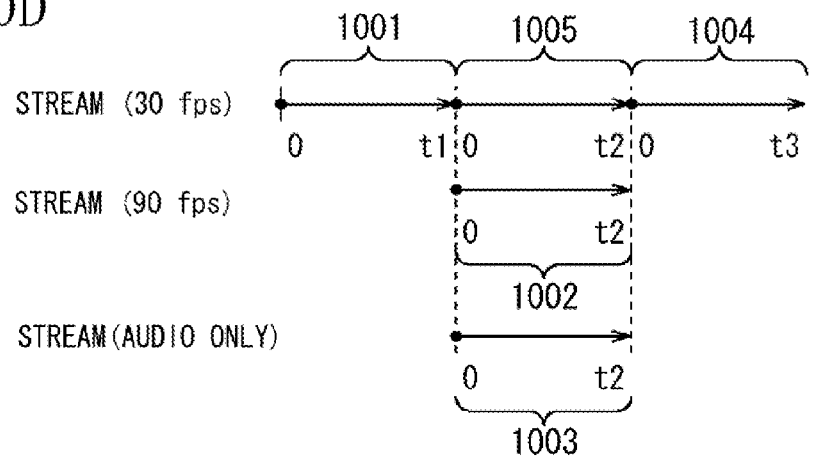

Lastly, after recording of the stream 1004 is started, a shooting button is depressed at a time t3, and the current state moves to the [without recording 204] state. Then, the recording of the stream 1004 terminates as shown in FIG. 10D. At this time, the CPU 102 controls the recorder control unit 921, carries out a frame number converting process as in the first embodiment, and generates a stream 1005 of only a moving image, from the stream 1002 of only a moving image shot at 90 frames per second.

(2-3-2) Generating Play List

Next, an example of recording a play list will be described with reference to FIG. 11.

A play list 1101 is recorded with respect to the streams 1001 to 1005 that are recorded as above described. In addition, any one or all of the play lists 1102 to 1104 are recorded in the BD 925 according to a user's selection.

In this case, the play list 1101 is a play list for continuously reproducing the streams 1001, 1005, and 1004. With respect to a section for reproducing the stream 1005, the stream 1005 of only a moving image is specified as a main path, and the stream 1003 of only a voice is specified as a sub path.

Two streams specified as a main path and a sub path are reproduced at the same time, so that the stream 1005 can be reproduced as a moving image with a voice. According to this play list, even if a slow reproduction moving image is shot at a high speed frame rate at only a specific scene, a normal reproduction moving image that is continuous from the start of shooting to the end of shooting (t1+t2+t3) can be reproduced.

The play list 1102 is a play list for reproducing only the stream 1002. Only the moving image of a specific scene shot at a high-speed frame rate can be slowly and smoothly reproduced. The reproduction time of the play list 1102 is 3×t2. The play list 1103 is a play list for continuously reproducing the streams 1001, 1002, and 1004. Only the moving image of a specific scene can be slowly and smoothly reproduced while it is continuous with normal reproduction of moving images of the preceding and succeeding scenes.

Further, the play list 1104 is a play list in which the streams 1001, 1005, and 1004 are continuously reproduced, and the stream 1002 is inserted at a time tx after reproduction of the stream 1004 is started. In this case, like the play list 1101, while the stream 1005 is concerned only with a moving image, the stream 1003 of only a voice is specified as a sub path. As can be seen in a broadcasting program of sports or the like, there can be easily attained an advantageous effect that a normal moving image of a specific scene is reproduced, and the moving image of the specific scene is slowly and smoothly reproduced after a short time has elapsed.

(3) Reproduction Mode

Next, an operation in [reproduction mode 203] will be described.

In the recorder control unit 921, a moving image and a voice recorded in the BD 925 are reproduced, and the moving image is output to the video output unit 128 and the LCD 126. In addition, the voice is output to an audio input/output unit 129.

(3-1) Operation of Recorder System Device

In an [index display 207] state, the recorder control unit 921 operates as follows.

First, a memory control circuit controls reading/writing of data from and to the RAM 124 as a temporary image signal storage of a BD control circuit.

The BD control circuit of the recorder control unit 921 reads out a play list recorded in the BD 925, and stores the readout in the RAM 124 according to a logical format of BD. From the play list, the CPU 102 determines a stream that includes an image to be displayed as an index, and a position of the image, and a BD control circuit reads out a portion including the image in the stream from the BD 925 and stores the readout in the RAM 124. Then, as in the first embodiment, an index image generated from the image is output.

In the [reproduction 208] state, the recorder control unit 921 operates as follows. First, a memory control circuit controls reading/writing of data from and to the RAM 124 as a temporary image signal storing place of the BD control circuit. The BD control circuit reads out a stream from the BD 925 and stores the readout in the RAM 124 according to the logical format of BD. Then, as in the first embodiment, a moving image and a voice of the stream are reproduced.

(3-2) Example of BD Reproduction

Next, a reproduction example of the BD 925 recorded in the recording example will be described by using the video camera 900 of the present embodiment.

In the [index display 207] state, the play list 1101 is used for index display in an initial state. In other words, as a cut line of s stream reproduced by the play list 1101, the head image of the stream 1001, the head image of the stream 1004, and the head image of the stream 1003 are arranged side by side, and an index image is displayed. Then, as in the first embodiment, the reproduction is started from a portion of the corresponding cut line with respect to the play list and image selected by the user.

Third Exemplary Embodiment

A third embodiment will be described in an order below.
(1) Entire configuration
(2) Camera mode
(2-1) Operation of camera system device
(2-2) Operation of recorder system device
(2-3) Example of HDD recording
(2-3-1) Stream recording
(2-3-2) Generating of play list
(3) Reproduction mode
(3-1) Operation of recorder system recorder
(3-2) Reproduction example of HDD In comparison with the first embodiment, a configuration of a recording unit is different in the third embodiment. Further, the third embodiment is different in that an HDD is used as a recording medium. In addition, with respect to a scene shot at a high speed frame rate, a moving image and a voice are recorded as different streams, and a stream of only a voice that lastly becomes unnecessary is deleted.

(1) Entire Configuration

Figure 12:
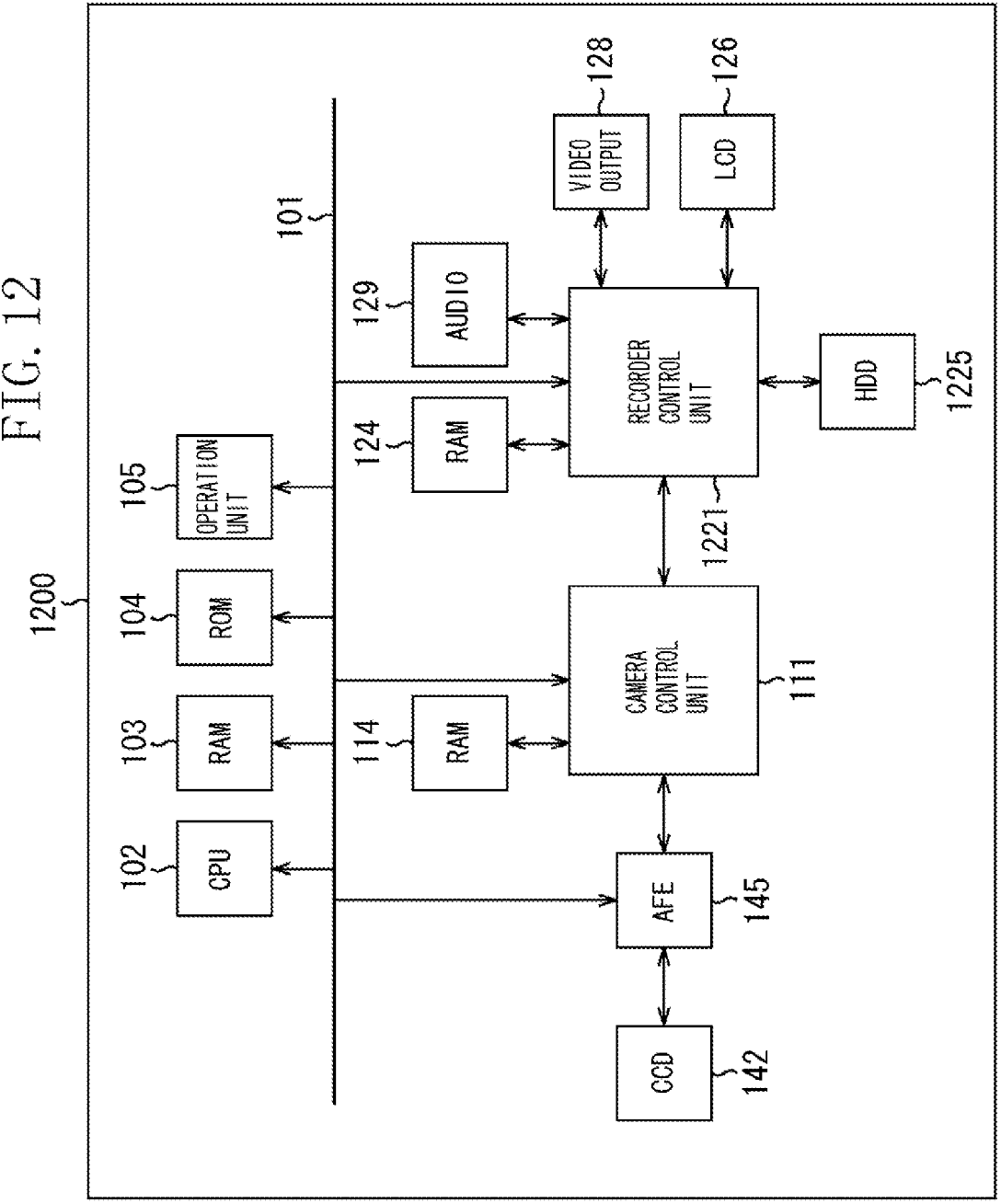
FIG. 12 is a block diagram illustrating an exemplary configuration of an image recording apparatus according to a third exemplary embodiment of the present invention.

FIG. 12 is a block diagram illustrating an exemplary configuration of an image recording apparatus according to the third embodiment. Hereinafter, as one example of the image recording apparatus, a video camera 1200 will be described.

In the video camera 1200, compared to the video camera 100 in the first embodiment, the recorder control unit 1221 is replaced with a recorder control unit 121 having a different internal configuration, and the DVD 125 is replaced with an HDD 1225.

(2) Camera Mode

In the [normal recording 205] state and the [high speed shooting/recording 206] state, the moving image signal and the voice signal processed in the recorder control unit 1221 are recorded in the HDD 1225.

(2-1) Operation of Camera System Device

An operation of the CCD image sensor 142, the AFE 145, and the camera control unit 111 is identical to that of the first embodiment. Accordingly, a description will not be repeated here.

(2-2) Operation of Recorder System Device

The recorder control unit 1221 is an ASIC in which the DVD control circuit of the recorder control unit 121 in the first embodiment is replaced with an HDD control circuit.

In the [normal recording 205] state, the memory control circuit controls reading/writing of data from and to the RAM 124 as a temporary image signal storage of the HDD control circuit. The HDD circuit records the stream having the multiplexed moving image and voice in the HDD 1225 that serves as a recording medium.

In the [high speed shooting/recording 206], the recorder control unit 1221 carries out a process for acquiring and encoding an image signal at a 3× speed in comparison with the [normal recording 205] state. In this case, the image encoding circuit carries out an encoding process while a frame rate of the reproduction is 30 frames per second regardless of a frame rate of an input image signal. On the other hand, encoded data of a voice signal is recorded in the HDD 1225 as a separate stream from a moving image unlike the [normal recording 205] state.

When the [normal recording 205] state moves to the [without recording 204] state, management information such as a play list relative to a stream recorded so far in the HDD 1225 is generated by the CPU 102 and is written into the RAM 124. The BD control circuit of the recorder control unit 1221 records the management information in the HDD 1225 and deletes an unnecessary stream from the HDD 1225.

(2-3) Example of HDD Recording

Next, an example of recording into the HDD 1225 will be described in which a moving image of a high speed frame rate is shot while the moving image of a normal frame rate is being shot using a video camera 900 of the present embodiment. In the case where a recording medium is HDD, the stream serving as real data of a moving image and a voice, and a play list in which a reproduction sequence of the stream is specified, are recorded as follows.

(2-3-1) Stream Recording

An example of recording the stream data in the HDD 1225 will be described with reference to FIG. 13A to FIG. 13D.

Figure 13A:
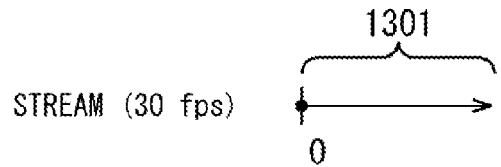
FIG. 13A, FIG. 13B, FIG. 13C, and FIG. 13D are views each illustrating a recording example of a stream according to the third exemplary embodiment of the present invention.

A user depresses an shooting button, and the [without recording 204] state moves to the [normal recording 205] state, so that the moving image and the voice shot at 30 frame per second are recorded as a stream 1301, as illustrated in FIG. 13A.

Figure 13B:
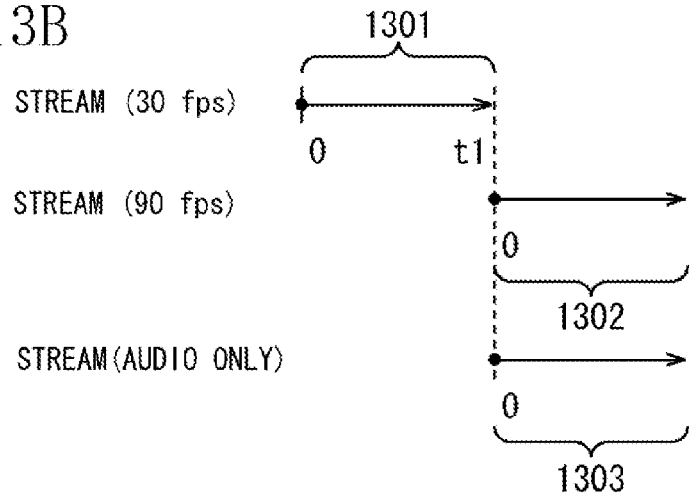

After recording of the stream 1301 is started, a high speed shooting button is depressed at a time t1, and the current state is moved to the [high speed shooting/recording 206] state, so that recording of the stream 1301 terminates as illustrated in FIG. 13B. Subsequently, the stream 1302 of only the moving image shot at 90 frames per second and the stream 1303 of only the voice are newly recorded.

Figure 13C:
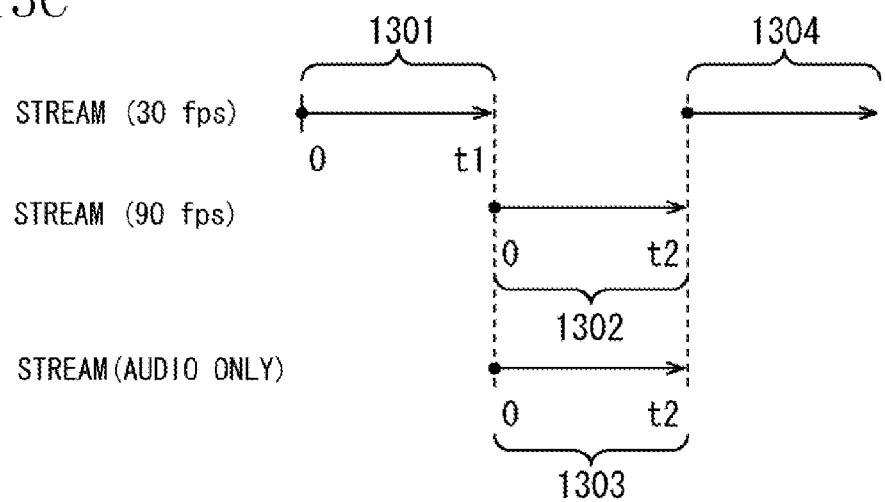

After the recording of the streams 1302 and 1303 is started, the high speed shooting button is depressed at a time t2, and the current state moves to the [normal recording 205] state, so that recording of the streams 1302 and 1303 terminates as shown in FIG. 13C. Subsequently, the moving image and the voice shot at 30 frames per second are newly recorded as a stream 1304. The fact that the stream 1302 and the voice stream 1303 serving as a high speed frame rate have been recorded for a period from t1 to t2, and identification information for identifying a recording area, are recorded in the management information area of the HDD 1225.

Figure 13D:
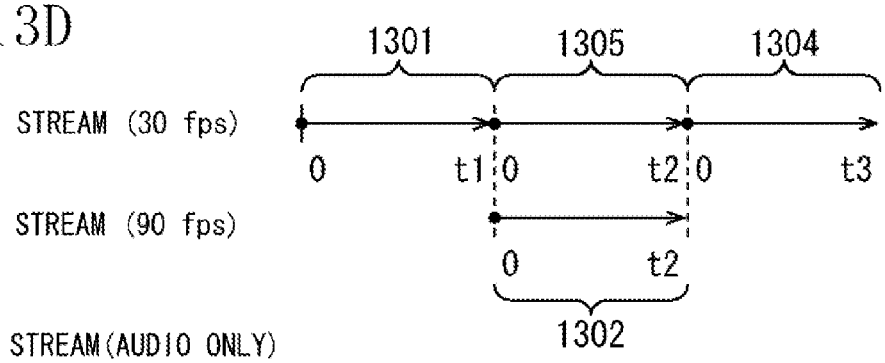

Lastly, after the recording of the stream 1304 is started, the shooting button is depressed at a time t3, and the current state moves to the [without recording 204] state, so that the recording of the stream 1304 terminates as shown in FIG. 13D. At this time, the CPU 102 controls the recorder control unit 1221 and carries out a frame number converting process as in the first embodiment. Then, the stream 1302 of only the moving image shot at 90 frames per second and the stream 1303 of only the voice are multiplexed and recorded into the stream 1305 that can be reproduced in synchronization of the moving image and the voice.

In this manner, the stream 1305 can be reproduced as a moving image together with a voice, as in the streams 1301 and 1304 recorded in the [normal recording 205] state. After the frame number converting process, the unnecessary stream 1303 of only voice is deleted from the HDD 1225. Therefore, it becomes unnecessary to redundantly add the voice for normal recording added to the moving image, to a moving image for slow reproduction, so that a recording medium can be efficiently used without any waste.

(2-3-2) Generating of Play List

Generating of a play list is identical to that of the first embodiment. Accordingly, a description will not be repeated here.

(3) Reproduction Mode

Next, an operation in [reproduction mode 203] will be described. In the recorder control unit 1221, the moving image and the voice recorded in the HDD 1225 are reproduced, the moving image is output to the video output unit 128 and the LCD 126, and the voice is output to the audio input/output unit 129.

(3-1) Operation of Recording System Device

In a [index display 207] state, the recorder control unit 1221 operates as follows. First, the memory control circuit controls reading/writing of data from and to the RAM 124 as a temporary image signal storage of the HDD control circuit. The HDD control circuit of the recorder control unit 1221 reads out a play list recorded in the HDD 1225 and stores the readout in the RAM 124.

From the play list, the CPU 102 determines the stream that includes the image to be displayed as an index, and a position of the image, and the HDD control circuit reads out a portion including the image of the stream from the HDD 1225 and stores the readout in the RAM 124. Then, the index image generated from the image is output as in the first embodiment.

In a [reproduction 208] state, the recorder control unit 1221 operates as follows. First, the memory control circuit controls reading/writing of data from and to the RAM 124 as a temporary image signal storage of the HDD control circuit. The HDD control circuit reads out a stream from the HDD 1225 and stores the readout in the RAM 124. Then, the moving image and the voice of the stream are reproduced as in the first embodiment.

(3-2) Reproduction Example of HDD

A reproduction example of HDD is substantially identical to that of DVD in the first embodiment. Therefore, a description will not be repeated here.

(Other Embodiments)

Each unit in the image recording apparatus according to the embodiments of the present invention and steps of an image recording method can be realized by programs stored in a RAM, a ROM or the like of a computer. These programs and a computer-readable storage medium having the programs stored therein are included in embodiments of the present invention.

In addition, embodiments of the present invention can be realized as a system, an apparatus, a method, a program, or a storage medium, for example. More specifically, embodiments of the present invention may be applied to a system including a plurality of devices, or alternatively, may be applied to an apparatus including one device.

According to embodiments of the present invention, programs of software realizing functions of the embodiments can be directly provided to a system or an apparatus. Alternatively, embodiments of the present invention can be realized by remotely supplying program codes, and then, reading out and executing the supplied program codes by a computer of the system or apparatus.

Therefore, in realizing functions and processing of embodiments of the present invention, program codes per se to be installed in the computer also constitute an embodiment of the present invention. Namely, embodiments of the present invention include computer programs per se for realizing functions and processing of an embodiment of the present invention.

In this case, the type of program can be selected from any one of object codes, interpreter programs, and OS script data as long as program functions are provided.

Storage mediums for supplying programs include mediums such as a floppy® disk, a hard disk, an optical disk, a magneto-optical disk, a MO, a compact disc-read only memory (CD-ROM), a CD-recordable (CD-R), and a CD-rewritable (CD-RW). In addition, the storage mediums also include mediums such as a magnetic tape, a nonvolatile memory card, a ROM, and a digital versatile disc (DVD (DVD read only memory (DVD-ROM) and DVD recordable (DVD-R)).

Programs can also be supplied by accessing the website of the Internet using browser of a client's computer and downloading computer programs per se of embodiments of the present invention from the website. Alternatively, the programs can also be supplied by downloading a compressed file including an automatic installation function in a storage medium such as a hard disk.

In addition, the programs can also be supplied by dividing program codes constituting programs of embodiments of the present invention into a plurality of files and downloading the respective files from different websites. Namely, embodiments of the present invention also include a WWW (World Wide Web) server for allowing a plurality of users to download the program files for realizing the functions and processing of embodiments of the present invention by a computer.

In addition, the program of embodiments of the present invention may be encrypted, the encrypted programs are stored in a storage medium such as a CD-ROM, the stored programs are distributed to users, and then, users satisfying predetermined conditions can download key information for decrypting from websites via the Internet. Then, embodiments of the present invention can be realized by executing the encrypted programs using the key information and installing the programs in a computer.

In addition, a computer executes the read out programs, thereby the functions of the embodiments are realized. An OS or the like running on a computer carries out part or all of actual processing operations on the computer based on instructions of the programs, and then, the functions of the embodiments can be realized by the processing operations as well.

Further, the programs read out from a storage medium are written into a memory of a function extension board inserted into a computer or a function extension unit connected to a computer. After that, a CPU of the function-enhanced board or the function-enhanced unit carries out part or all of the actual processing based on instructions of the programs, and the functions of the embodiments are realized by the processing as well.

While embodiments of the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image recording apparatus comprising:
a recorder configured to record stream data in a recording medium; and
a central processing unit (CPU) that:
(a) generates third stream data by using a moving image signal recorded at a first frame rate,
(b) controls the recorder to record the third stream data in the recording medium,
(c) starts to generate second stream data by using a moving image signal recorded at a second frame rate in response to an instruction for instructing a change of a frame rate while the third stream data is generated,
(d) controls the recorder to record the second stream data in the recording medium,
(e) determines a frame rate of the third stream data,
(f) controls the recorder to generate first stream data relating to a determined frame rate of the third stream data from the second stream data based on a predetermined process, and
(g) controls the recorder to record the first stream data in the recording medium, wherein the second frame rate is higher than the first frame rate, and wherein the predetermined process includes a process for converting a frame number of the second stream data based on the determined frame rate of the third stream data.

2. The image recording apparatus according to claim 1, wherein the CPU controls the recorder to record a play list in the recording medium, the play list is used for reproducing predetermined data including the first stream data and the third stream data, and the predetermined data does not include the second stream data.

3. The image recording apparatus according to claim 2, wherein the first stream data and the third stream data are reproduced continuously by using the play list.

4. The image recording apparatus according to claim 1, wherein the CPU controls the recorder to record the first stream data and an audio signal relating to the second stream data in the recording medium so that the audio signal and the first stream data are related.

5. The image recording apparatus according to claim 1, wherein the CPU controls the recorder to record a play list in the recording medium, and the play list is used for reproducing the second stream data.

6. The image recording apparatus according to claim 1, wherein the CPU controls the recorder to record a play list in the recording medium, and the play list is used for reproducing the second stream data and the third stream data.

7. The image recording apparatus according to claim 1, wherein the CPU controls the recorder to record a play list in the recording medium, and the play list is used for reproducing the first stream data, the second stream data, and the third stream data.

8. The image recording apparatus according to claim 1, further comprising an image sensor.

9. The image recording apparatus according to claim 1, wherein the image recording apparatus includes a video camera.

10. A method for recording an image, the method comprising:

generating third stream data by using a moving image signal recorded at a first frame rate;

recording the third stream data in a recording medium;

starting to generate second stream data by using a moving image signal recorded at a second frame rate in response to an instruction for instructing a change of a frame rate while the third stream data is generated, wherein the second frame rate is higher than the first frame rate;

recording the second stream data in the recording medium;

determining a frame rate of the third stream data;

generating first stream data relating to a determined frame rate of the third stream data from the second stream data based on a predetermined process, wherein the predetermined process includes a process for converting a frame number of the second stream data based on the determined frame rate of the third stream data; and recording the first stream data in the recording medium.

11. A non-transitory computer-readable storage medium that stores a program for causing a computer to perform a method, the method comprising:

generating third stream data by using a moving image signal recorded at a first frame rate;

recording the third stream data in a recording medium;

starting to generate second stream data by using a moving image signal recorded at a second frame rate in response to an instruction for instructing a change of a frame rate while the third stream data is generated, wherein the second frame rate is higher than the first frame rate;

recording the second stream data in the recording medium;

determining a frame rate of the third stream data;

generating first stream data relating to a determined frame rate of the third stream data from the second stream data based on a predetermined process, wherein the predetermined process includes a process for converting a frame number of the second stream data based on the determined frame rate of the third stream data; and recording the first stream data in the recording medium.

* * * * *